United States Patent [19]

Link et al.

[11] Patent Number: 4,942,689

[45] Date of Patent: Jul. 24, 1990

[54] FISHING WEIGHT

[75] Inventors: Donald J. Link, Shakopee, Minn.; Lonnie D. Stanley, Lufkin, Tex.

[73] Assignee: Dylist, Inc., Shakopee, Minn.

[21] Appl. No.: 215,030

[22] Filed: Jul. 5, 1988

[51] Int. Cl.$^5$ .............................................. A01K 95/00
[52] U.S. Cl. .................................. 43/42.24; 43/42.36; 43/44.9
[58] Field of Search ................. 43/43.12, 43.14, 44.81, 43/44.87, 44.91, 42.24, 42.36, 42.05, 42.38, 42.39, 42.44

[56] References Cited

U.S. PATENT DOCUMENTS

| | | | |
|---|---|---|---|
| 3,091,885 | 6/1963 | Ulsh | 43/43.12 |
| 3,947,990 | 4/1976 | Johnson | 43/44.9 |
| 4,139,963 | 2/1979 | Ingram | 43/42.79 |
| 4,744,168 | 5/1988 | McClellan | 43/42.24 |

Primary Examiner—Nicholas P. Godici
Assistant Examiner—Michael William Starkweather
Attorney, Agent, or Firm—Harold H. Dutton, Jr.

[57] ABSTRACT

A fishing weight comprising a bullet shaped lead body portion having an axial bore therethrough, an enlarged recess formed in one end of the body portion, a flexible, rubbery material substantially filling the recess, a cavity formed in the rubbery material in the recess, the cavity opening into the axial bore and having another opening extending outwardly opposite the axial bore for receiving the eye of a fishhook, the other opening being of a smaller size than the cavity and releasably retaining the fishhook eye therein until a force is exerted upon the fishhook for withdrawing the fishhook therefrom; a fishing lure includig the improved weight; and a method for releasably affixing a fishing weight to the eye of the fishhook.

12 Claims, 1 Drawing Sheet

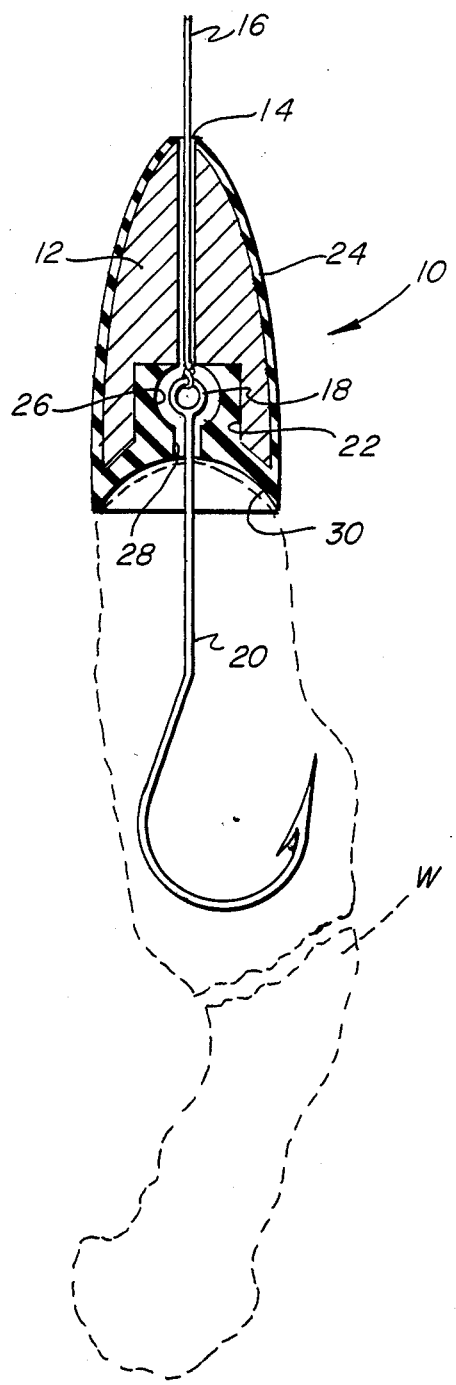
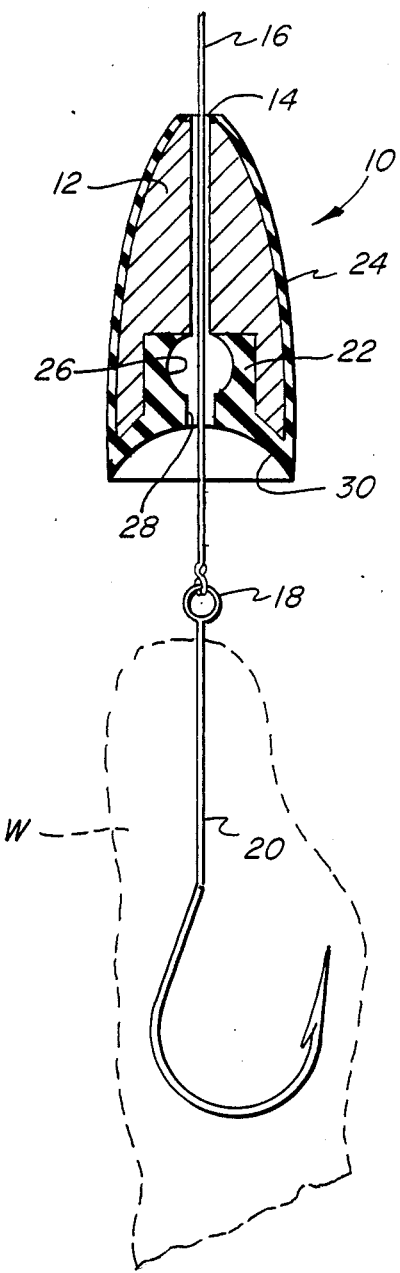
FIG. 1
FIG. 2

FISHING WEIGHT

This invention relates to an improved fishing weight of the type commonly used for artificial worm fishing. More particularly, the invention relates to an improvement in fishing weight of the type known as a bullet weight or slip sinker as are particularly adapted for use with artificial plastic worms. The invention also relates to a new fishing lure comprising the improved weight in combination with a fishhook, and a method for releasably securing a weight to the eye portion of a fishhook.

BACKGROUND AND OBJECTS OF THE INVENTION

Artificial or plastic worms are one of the most popular and versatile fishing lures in use today, both among the casual or amateur fishermen as well as among professional fishermen. The most common technique for the use of such lures is to rig the worm in a weedless fashion on a hook, with the point of the hook buried in the plastic. When a fish takes the lure and the hook is "set", the force of the hook set pulls the hook out of the soft plastic and into the fish.

Another popular rigging technique for this lure involves the use of an exposed hook point, but with a wire weedguard covering the point of the hook to keep the lure from becoming snagged on grass, trees, etc.

Along with such lures, a weight is usually employed to keep the lure on the bottom of the lake, river, etc., and to help in casting the light-weight lure. Most often, the weight is a conical or bullet shaped weight having an axial bore therethrough, and a recess at the larger end thereof which is complementary in shape to the end of the plastic worm. The fishing line passes through the axial bore, and the weight is free to slide along the line. Most typically, such weights are simply "lead colored" and do little to enhance the appearance of the lure. Usually, when new the weights are rather shiny, but after use for a period of time, the weights become a dull grey, oxidized color. More recently, painted weights have become available in colors to match the most commonly used worm colors.

The reason that the weight is allowed to slide along the line is to make it more difficult for a fighting fish to use the weight to its advantage and dislodge the hook during the fight. When the weight slides up the line, as during the fighting of the fish, only a small amount of weight is present in the vicinity of the hook, generally limited to the weight of the bare hook and the plastic worm, and very little leverage is present, so that it is far more difficult for the hook to be dislodged.

However, with a freely sliding weight on the line, it often happens during fishing that the weight will slide up the line before a fish is hooked. This allows the weight to fall on one side of a log, for example, while the worm and hook remain on the opposite side. When this happens, the bullet shape of the weight no longer aids in guiding the lure over the log, and quite often, upon continued pulling of the line, the hook is hooked into the log. When this happens, it becomes quite difficult to dislodge or free the hook.

As a result, fishermen have developed a technique for "pegging" the sinker. With this technique, a small piece of wood, for example the end of a toothpick, is forced into the axial hole at the small end of the sinker. The wood clamps the line against the side of the hole to prevent the sinker from sliding on the line. When the hook is set into a fish, the force of the hookset is adequate to release the piece of wood so that the weight is again free to slide for the purposes indicated above, as the fish is played. Of course each time that the hook is set, whether a fish is hooked or not, the wood, i.e. toothpick, must be replaced, causing some inconvenience to the fisherman.

The disadvantage of this "pegging" technique, however, is that the fishing line tends to be crimped, and thus weakened, at a point very close to the hook, and the only way to overcome this disadvantage is to use stronger or heavier weight line. While this does not truly overcome the problem, it does make the line less likely to break. Yet there will still be a weak spot in the line where it has been clamped between the wood and the lead weight, and the line is still most likely to break at this point.

The present invention overcomes the disadvantages of the prior technique of "pegging" the weight, while still providing the same advantages.

Accordingly, a primary object of the present invention is to provide an improved fishing weight for use with plastic or artificial worms.

Another object of this invention is to provide a fishing weight for use with plastic worms which may slide on the line, but which is kept in place against the worm during fishing until a fish is hooked.

A further object of the invention is to provide a fishing weight which includes a portion for releasably gripping the eye of the fishhook for releasably holding the weight in place against the plastic worm.

Yet another object of this invention is to provide an improved fishing weight which is coated with a soft rubber-like coating which may incorporate a variety of coloring materials.

Still a further object of the invention is to provide a rubber coated lead fishing weight in which the rubber of the coating includes a portion for releasably gripping the eye of the fishhook.

Yet another object of the invention is to provide a soft plastic or rubber coated fishing weight having a recess molded in the lead portion with the rubber coating the recess and partially constricting the opening into the recess for retaining the eye of the fishhook therein.

DESCRIPTION OF THE INVENTION

The fishing weight according to the present invention comprises a lead body having an axial bore passing therethrough. At one end of the body, a generally cylindrical or spherical recess is molded in the lead body, and is of a size slightly greater than the eye of the fishhook intended to be used with the weight. The size of the recess should be larger than the largest dimension of the eye of the hook so that the eye is free to move in the recess. This also allows a range of different size hooks to be used with the same weight. The entire body (with the exception of the axial bore) is coated with a flexible rubber (preferably synthetic) or plastic coating.

At the end of the rubber coated body having the enlarged recess, the rubber is molded in the recess so as to provide a cavity which may be spherical or cylindrical, and including two, generally axially aligned openings. One of these openings coincides with the axial bore in the body, and the other opening is slightly larger in diameter and will surround the shank of a fishhook.

By this construction, the eye of a fishhook may be inserted into the cavity through the larger of the two openings at the distal end of the weight. The flexibility of the rubber allows a slight deformation of this opening to permit the insertion, and then resumes its original shape. In this manner, the eye of the fishhook is retained in the molded rubber cavity. However, when the hook is set into a fish, the hook will pull out of the cavity and the weight is then free to slide on the line.

Preferably, the lead body is of a conical or bullet shape, thus retaining the advantage of assisting the lure in travelling over obstacles in the water. Further, the end of the weight nearest the worm includes a concave shape also molded in the rubber to receive the "head" end of the worm.

The rubber used for coating the lead body may include any of a variety of coloring or design materials, including pigmentation and plastic or metallic flakes, for enhancing the appearance of the weight and allowing it to more closely conform to the color of the worm, and enhance the overall appeal of the lure. Alternatively, the rubbery material would only be used in the enlarged recess in the body portion and the outer surface of the weight would be the natural metallic color.

DESCRIPTION OF THE DRAWINGS

The foregoing and other further and additional objects and advantages of the present invention will become apparent from a further consideration of the following detailed description when taken together with the accompanying drawings, in which:

FIG. 1 is a longitudinal cross sectional view of a fishing weight according to the present invention with an artificial worm mounted on a hook tied to a fishing line, ready for use; and FIG. 2 is a longitudinal cross sectional view similar to FIG. 1, showing the fishing weight before the eye of the fishhook is inserted therein.

DESCRIPTION OF PREFERRED EMBODIMENTS

With reference to the accompanying drawings, the weight according to the present invention is generally designated 10, and is seen to include a molded lead body portion 12 which is provided with an axially extending central bore 14 through which the fishing line 16 passes. The line 16 is attached to the eye 18 of a conventional fishing hook 20. Such a fishing hook is of the type commonly used for fishing with plastic or artificial worms.

The lead body portion has an enlarged recess 22 at the hook end of the body, the recess being significantly larger than the eye of the hook as shown. This recess may be cylindrical, as shown, or may be spherical, as a function of the convenience of the manufacturer and the mold used.

The lead body portion of the weight is coated with a soft, flexible rubber coating 24, such as a silicone type rubber which, after curing, has sufficient strength to hold its shape, but is sufficiently flexible so that it may be compressed or flexed with but moderate application of force. The rubber coating 24 extends over the entire outer surface of the lead body portion, and also substantially fills the recess 22. Preferably the rubber coating 24 does not extend into the axial bore 14, as this would inhibit the ability of the weight to slide along the fishing line 16.

Alternatively, only the recess 22 need have the rubber therein, should it not be desired to use the rubber for color or other similar enhancements.

A spherical cavity 26 is molded into the rubber coating within the recess 22. The cavity 26 is of a size slightly larger than the eye of the hook, and an opening 28 is provided in axial alignment with the bore 14 through the lead body. The size of the opening 28 is such that the shank of the hook 20 extends freely through the opening 28, but is of a lesser diameter than the largest dimension of the eye, i.e. smaller than the diameter of the eye. The flexibility of the rubber is such that the eye of the hook may pass through the opening 28 into the cavity 26 upon application of but moderate manual pressure, and the opening 28 returns to its normal shape and substantially recloses around the shank after the eye has been inserted into the cavity. Preferably the end of the weight facing towards the hook includes a generally rounded concavity 30, concave away from the body and toward the worm, so that the 'head' end of the worm or lure W conforms to this cavity.

Preferably, the axial bore 14 through the weight body is not coated with the rubber compound, since this would tend to inhibit the ability of the line to slide through this bore when playing a fish. The inside of this bore 14 is, then, the only portion of the lead weight which is not coated with the rubber, in the preferred embodiment.

In this manner, the flexible rubber coating in the area of the recess 22, including the cavity 26 and the opening 28, serves to retain the weight in place with respect to the hook and the lure during fishing through weeds, grass, brush piles, trees, rocks and the like, but upon setting the hook into a fish, the weight and hook becomes separated and the weight is then free to slide on the line while the fish is played, in a conventional manner.

Further, this manner of holding the weight in place serves the additional advantage of helping to keep the worm or other lure in place on the hook, as the end of the worm is then protected from contact with objects which may tend to force the lure down on the shank of the hook. When the coating completely covers the lead body as shown, the soft coating helps to prevent the weight from being damaged such as to close the axial bore, when fished around hard objects such as rocks.

It will be apparent from the foregoing description that this invention is capable of still further variation and modification without departing from the spirit of the invention, and this application is intended to cover any and all variations, modifications and adaptations of the invention which fall within the spirit of the invention and the scope of the appended claims.

What I claim is:

1. A fishing weight comprising a lead body portion having an axial bore therethrough, an enlarged recess formed in one end of said body portion, a flexible, rubbery material substantially filling said recess, a cavity formed in said rubbery material in said recess, said cavity opening into said axial bore and having another opening extending outwardly opposite said axial bore for receiving the eye of a fishhook, said other opening being of a smaller size than the eye of a fishhook and said cavity for releasably retaining the fishhook eye therein until a force is exerted upon said fishhook for withdrawing the fishhook therefrom.

2. A fishing weight as in claim 1 and wherein said rubbery material extends in a continuous manner as a coating around the outer surface of said body portion.

3. A fishing weight as in claim 1 and wherein said body portion is generally conical and said recess is formed in the larger end thereof.

4. A fishing weight as in claim 3 and wherein said axial bore is essentially uncoated with said rubbery material.

5. A fishing weight as in claim 4 and wherein the larger end of said weight is concave away from said axial bore.

6. A fishing weight as in claim 5 and wherein said other opening is of a diameter less than the greatest dimension of the eye of the hook.

7. A fishing lure comprising a fishhook having an eye portion, a shank portion and a hook portion, said eye portion being fastened to a fishing line; a fishing weight having a lead body portion with an axial bore therethrough, said fishing line passing through said axial bore, an enlarged recess formed in one end of said body portion, a flexible, rubbery material substantially filling said recess, a cavity formed in said rubbery material in said recess, said cavity opening into said axial bore and having another opening extending outwardly opposite said axial bore for receiving said shank portion of said fishhook, said other opening being of a smaller size than said cavity and releasably retaining said eye portion therein until a force is exerted upon said fishhook for withdrawing the fishhook therefrom.

8. A fishing lure as in claim 7 and wherein said rubbery material extends in a continuous manner as a coating around the outer surface of said body portion.

9. A fishing lure as in claim 7 and wherein said body portion is generally conical and said recess is formed in the larger end thereof.

10. A fishing lure as in claim 9 and wherein said axial bore is essentially uncoated with said rubbery material.

11. A fishing lure as in claim 10 and wherein the larger end of said weight is concave away from said axial bore.

12. A fishing lure as in claim 11 and wherein said other opening is of a diameter less than the greatest dimension of said eye portion of said hook.

* * * * *